United States Patent

Suenaga

(10) Patent No.: US 9,341,257 B2
(45) Date of Patent: May 17, 2016

(54) SHIFT ACTUATOR

(71) Applicant: HONDA MOTOR CO., LTD., Tokyo (JP)

(72) Inventor: Atsushi Suenaga, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/526,089

(22) Filed: Oct. 28, 2014

(65) Prior Publication Data

US 2015/0128742 A1    May 14, 2015

(30) Foreign Application Priority Data

Nov. 8, 2013    (JP) .................................. 2013-232561

(51) Int. Cl.
| | |
|---|---|
| *F16H 59/02* | (2006.01) |
| *F16H 63/06* | (2006.01) |
| *F16H 63/30* | (2006.01) |

(52) U.S. Cl.
CPC .............. *F16H 59/02* (2013.01); *F16H 63/065* (2013.01); *F16H 63/3023* (2013.01); *Y10T 74/20024* (2015.01)

(58) Field of Classification Search
CPC ... F16H 59/02; F16H 61/30; F16H 2061/307; F16H 3/38; F16H 63/065; F16H 63/3023; F16H 2059/6807; F15B 15/1409
See application file for complete search history.

(56) References Cited

U.S. PATENT DOCUMENTS

| | | | | |
|---|---|---|---|---|
| 3,863,518 | A * | 2/1975 | Webber | F16H 63/3023 192/3.51 |
| 4,970,942 | A * | 11/1990 | Sibeud | F16H 61/2807 74/336 R |
| 5,279,172 | A * | 1/1994 | Genise | F16H 61/30 74/335 |
| 7,624,659 | B2 * | 12/2009 | Futamura | F16H 59/70 324/207.22 |
| 7,845,247 | B2 * | 12/2010 | Olds | F16H 61/30 74/333 |
| 8,117,935 | B2 * | 2/2012 | Diemer | F16H 61/30 74/335 |
| 2008/0296112 | A1 * | 12/2008 | Kauffeldt | F16H 63/3023 192/3.57 |
| 2009/0031836 | A1 * | 2/2009 | Diemer | F16H 61/30 74/339 |

FOREIGN PATENT DOCUMENTS

| | | |
|---|---|---|
| JP | 4946217 B2 | 6/2012 |
| JP | 5280311 B2 | 9/2013 |

* cited by examiner

*Primary Examiner* — William Kelleher
*Assistant Examiner* — Jude Agendia
(74) *Attorney, Agent, or Firm* — Westerman, Hattori, Daniels & Adrian, LLP

(57) ABSTRACT

A shift actuator of the present invention includes a first and a second fluid pressure chamber for providing fluid pressure to each of a first and a second piston defined in a cylinder and a shift operating member inserted and disposed between the first piston and the second piston to move back and forth along the axial direction. On a side surface to the axial direction of the cylinder, an opening portion to which the shift operating member is inserted is formed. The opening portion is provided opening only to a part of the circumferential direction of the cylinder, and a lower end of the opening portion in a circumferential direction of the cylinder reaches a just under position in the vertical direction of the cylinder. This enables to discharge foreign matters included in hydraulic oil in the cylinder according to a stroke of the piston, with a simple configuration.

11 Claims, 7 Drawing Sheets

SHIFT ACTUATOR

REFERENCE OF THE RELATED ART

This disclosure relates to the subject involved in Japanese patent application No. 2013-232561 filed on 8 Nov. 2013, and is, as a whole, expressly incorporated to the patent application by the reference.

BACKGROUND OF THE INVENTION

1. Field of the Invention

This invention relates to a shift actuator providing fluid pressure to a piston slidably installed in a cylinder, whereby driving a shift operating member for gear shift by the piston.

2. Description of the Related Art

In the conventional art, there are transmissions having a synchronous mechanism for moving a synchro sleeve by a shift fork. And in these transmissions, as shown in Japanese Pat. No. 5280311 (patent literature 1), some have a shift actuator for driving a shift fork. The shift actuator includes a piston slidably installed in a cylinder, a fluid pressure chamber defined opposite to the piston in the cylinder to be supplied with fluid pressure such as oil pressure, and a shift fork (a shift operating member) driven by the piston, whereby the shift fork is driven to the shift direction (the axial direction of a fork shaft) by the piston which slides in the cylinder due to the fluid pressure supplied to the fluid pressure chamber.

Hereupon, in a shift actuator described in the patent literature 1, no mechanism for discharging hydraulic oil in a cylinder to the outside has especially been provided. Therefore, micro foreign matters (contamination) such as metal powder included in hydraulic oil have been likely to remain in the cylinder. This causes the micro foreign matters to be possibly bitten in a gap between an inner circumferential surface of the cylinder and an outer circumferential surface of a piston, whereby the inner circumferential surface has been likely to be damaged and worn.

Related to the point, in the Japanese patent No. 4946217 (patent literature 2), as a technique for reducing the risk that contamination is attached to a spool outer circumference of a spool valve, a configuration which a discharging oil passage opening with corresponding to a whole-circumferential groove formed on an outer surface of a valve spool on a sliding portion of the valve spool and a spool hole is disclosed.

However, when the configuration including a whole-circumferential groove formed on the discharging oil passage and the spool described in the patent literature 2 is applied to a shift actuator, providing the discharging oil passage can cause enlargement of an outside dimension of the shift actuator. Furthermore, forming the whole-circumferential groove on an outer circumference of the cylinder increases machining processes of the cylinder, whereby a manufacturing process of the shift actuator can be complicated.

SUMMARY OF THE INVENTION

In view of the above-described problems, the invention has an object to provide a shift actuator capable of discharging hydraulic oil in a cylinder and micro foreign matters included in the hydraulic oil to the outside according to a stroke of a piston with a simple configuration.

The present invention for solving the above mentioned problem includes a cylinder (35-1), a first piston (33-1) and a second piston (33-2) coaxially arranged in the cylinder (35-1), a first and a second fluid pressure chamber (34-1, 34-2) for providing fluid pressure to each of the first and the second piston (33-1, 33-2) defined in the cylinder (35-1), a shaft (13-1) disposed so that the axial direction thereof is parallel to the axial direction of the cylinder (35-1), and a shift operating member (12-1) supported by the shaft (13-1) with inserted and disposed between the first piston (33-1) and the second piston (33-2) to move back and forth along the axial direction of the shaft (13-1). An opening portion (15-1) to which the shift operating member (12-1) is inserted is formed on the lateral to the axial direction of the cylinder (35-1), the opening portion (15-1) is provided opening only to a part of the circumferential direction of the cylinder (35-1), and the lower end (18-1) of the opening portion (15-1) in the circumferential direction of the cylinder (35-1) reaches a just under position in the vertical direction of the cylinder (15-1).

By means of the shift actuator according to the present invention, the opening portion to which the shift operating member is inserted is formed on the cylinder is provided opening only to a part of the circumferential direction of the cylinder, whereby holdability of the piston by the cylinder (preventing the piston from disengaging and tumbling) and rigidity of the cylinder can be secured. Meanwhile, the lower end of the opening portion in the circumferential direction of the cylinder reaches a just under position in the vertical direction of the cylinder, whereby hydraulic oil in the cylinder can be discharged to the outside from the opening portion according to a stroke of the piston. This enables to discharge micro foreign matters (contamination) included in hydraulic oil to the outside of the cylinder, whereby wears and damages on the inner circumferential surface of the cylinder can be prevented.

Furthermore, in the above-mentioned shift actuator, the opening portion (15-1) may be formed in a shape including a lateral groove (15-1a) having a length dimension of the axial direction larger than a movable range of the shift operating member (12-1) and a vertical groove (15-1b) which is extended toward the lower side from a lower end of the lateral groove (15-1a), and has a length dimension of the axial direction shorter than the same of the lateral groove (15-1a).

By means of this configuration, the opening portion is formed in a shape including the vertical groove and the lateral groove, whereby dischargeability of hydraulic oil and micro foreign matters (contamination) from the opening portion can be improved with securing holdability of the piston by the cylinder (preventing the piston from disengaging and tumbling).

In addition, in the above-mentioned shift actuator, a position of an end surface (33-1a) near the shift operating member (12-1) of the first piston (33-1) is preferably same as a position of one end side (16-1) of the vertical groove (15-1b) at a maximum stroke position where the first piston (33-1) has maximally moved toward the shift operating member (12-1), therewith a position of an end surface (33-2a) near the shift operating member (12-1) of the second piston (33-2) is preferably same as a position of the other end side (16-2) of the vertical groove (15-1b) at a maximum stroke position where the second piston (33-2) has maximally moved toward the shift operating member (12-1).

By means of this configuration, positions of the end surfaces of the first and the second piston are configured to be same as a position of the end side of the vertical groove at a maximum stroke position of the first and the second piston, whereby stable stroke of the piston can be secured and therewith dischargeability of hydraulic oil and contamination from the vertical groove according to a stroke of the piston can be improved.

Furthermore, in the above-mentioned shift actuator, it is preferable that at least two cylinders (35-1, 35-2) are provided, the two cylinders (35-1, 35-2) are vertically arranged adjacent to each other, and centers (O1, O2) of each cylinder (35-1, 35-2) are disposed on mutually shifted positions in the lateral direction to the vertical direction, therewith the opening portions (15-1, 15-2) are formed on each cylinder (35-1, 35-2) respectively, and a side wall (36-2) other than the opening portion (15-2) of the cylinder on the lower side are disposed on a just under position in the vertical direction to the lower end (18-1) of the vertical groove (15-1b) of the cylinder (35-1) on the upper side.

By means of this configuration, the two cylinders are vertically arranged adjacent to each other, and each cylinder center is disposed on mutually shifted positions in the lateral direction to the axial direction, wherein the side wall other than the opening portion of the cylinder on the lower side is disposed at a just under position in the vertical direction of the lower end of vertical groove of the cylinder on the upper side, whereby hydraulic oil including micro foreign matters (contamination) discharged from the vertical groove of the cylinder on the upper side can be prevented from intruding into the opening portion of the cylinder on the lower side.

In addition, a magnetic substance (50) is preferably installed on a position including a just under position in the vertical direction of the vertical groove (15-1b) of the cylinder on the upper side (35-1) on the side wall (36-2) of the cylinder on the lower side (35-2).

By means of this configuration, micro foreign matters (contamination) such as metal powder included in hydraulic oil discharged from the vertical groove of the cylinder on the upper side can be absorbed and caught by the magnetic substance. This enables to securely prevent micro foreign matters from intruding to the cylinder on the lower side.

In addition, it is preferable that the shift actuator includes seal members (45-1, 45-2) disposed between each of the outer circumferential surfaces of the first and the second piston (33-1, 33-2) and the inner surface of the cylinder (35-1), and that the seal members (45-1, 45-2) are disposed on a position unexposed to the lateral groove (15-1a) at a maximum stroke position of the first and the second piston (33-1, 33-2).

By means of this configuration, the seal members are disposed on a position unexposed to the lateral groove at a maximum stroke position of the first and the second piston, whereby the seal members are prevented from contacting the end side of the vertical groove according to a stroke of the piston. Therefore, deterioration and damage of the seal members can be effectively prevented.

In addition, the references in the above-mentioned parentheses show the references of components in the embodiments described below as an example of the present invention.

By means of the shift actuator according to the present invention, hydraulic oil in a cylinder and micro foreign matters included in the hydraulic oil can be discharged to the outside according to a stroke of a piston, with a simple configuration.

DETAILED DESCRIPTION OF THE INVENTION

Embodiments of the present invention are described below in detail referring to the attached drawings.

The First Embodiment

Figure 1:
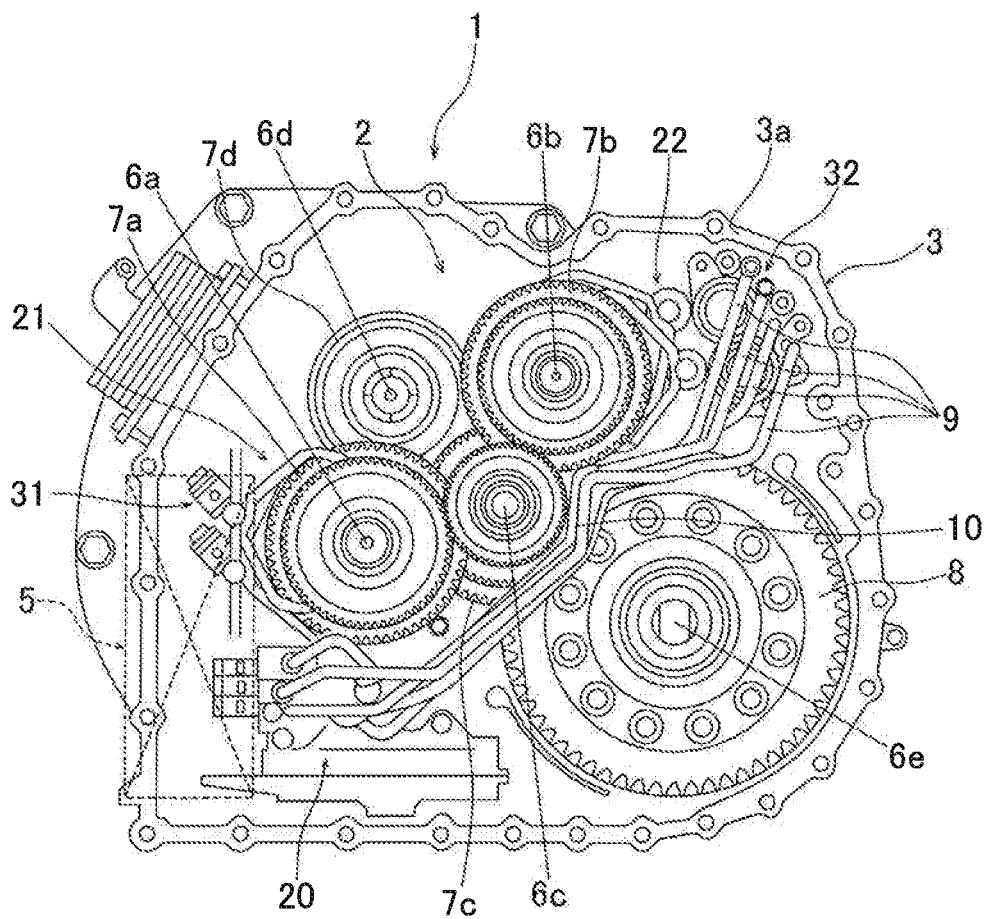
FIG. 1 is a schematic sectional side view showing an automatic transmission including a shift actuator in accordance with an embodiment of the present invention.

FIG. 1 is a schematic sectional side view showing an overall configuration example of a transmission (automatic transmission) including a shift actuator in accordance with an embodiment of the present invention. The transmission 1 shown in the figure includes a gear mechanism 2 installed in a casing 3 and a hydraulic control body (hydraulic control device) 5 mounted on the side of the gear mechanism 2. The gear mechanism 2 includes a first input shaft 6a, a second input shaft 6b, an output shaft 6c, an idle shaft 6d, and a differential shaft 6e arranged in mutually parallel to one another, and various kinds of gears for forming gear shift stages are rotatably installed around each of these rotation shafts 6. Furthermore, FIG. 1 shows the transmission 1, in a state where a transmission case (not shown) joined to a joining surface 3a on the front side of the casing 3 disposed on the front side of the axial direction of the rotation shafts 6 is disengaged, viewed from the front side of the axial direction of the rotation shafts 6. In FIG. 1, further, a detailed showing of components except for the gear mechanism 2 provided to the transmission 1 and synchronous engaging devices (synchromesh mechanisms) 21 and 22 described below are omitted.

The first input shaft 6a is connected so as to be engaged with and disengaged from the output shaft (driving shaft) of an engine (not shown) which is a driving source of the vehicle through a first clutch (not shown). In addition, the second input shaft 6b is connected so as to be engaged with and disengaged from the output shaft of the engine through a second clutch (not shown). On the first input shaft 6a, a plurality of drive gears 7a for changing speed of rotation caused by driving force input to the first input shaft 6a are installed, and on the second input shaft 6b, a plurality of drive gears 7b for changing speed of rotation caused by driving force input to the second input shaft 6b are installed. Furthermore, the drive gears 7a on the first input shaft 6a are drive gears for even-numbered gear shift stages, and the drive gears 7b on the second input shaft 6b are drive gears for odd-numbered gear shift stages.

On the output shaft 6c, in addition, a plurality of driven gears 7c engaged with the plurality of drive gears 7a and 7b on the first and the second input shaft 6a and 6b are fixed. The output shaft 6c outputs driving force speed changed through the drive gears 7a, 7b and the driven gears 7c. Furthermore, the transmission 1 includes a first synchronous engaging device 21 for selectively synchronizing and engaging one of the drive gears 7a on the first input shaft 6a with the first input shaft 6a and a second synchronous engaging device 22 for selectively synchronizing and engaging one of the drive gears 7b on the second input shaft 6b with the second input shaft 6b. Additionally, in the transmission 1, a first shift actuator 31 for driving the first synchronous engaging device 21 and a second shift actuator 32 for driving the second synchronous engaging device 22 are provided.

Whereas, the hydraulic control body 5 is a device provided with such as a valve for changing speed which is operated by oil pressure, and is installed on the side part of the lower side of the transmission 1 (the left hand side of FIG. 1). The hydraulic control body 5 is communicated to an adjacent hydraulic oil port portion 20 through the unshown oil passage. Furthermore, each port in the hydraulic port portion 20 is communicated to the second shift actuator 32 through a plurality of hydraulic pipes 9 in which hydraulic oil flows. This causes hydraulic oil (control oil pressure) supplied from an oil pump (unshown) and discharged from the hydraulic control body 5 to be fed to the second shift actuator 32 through the hydraulic pipes 9.

Figure 2:
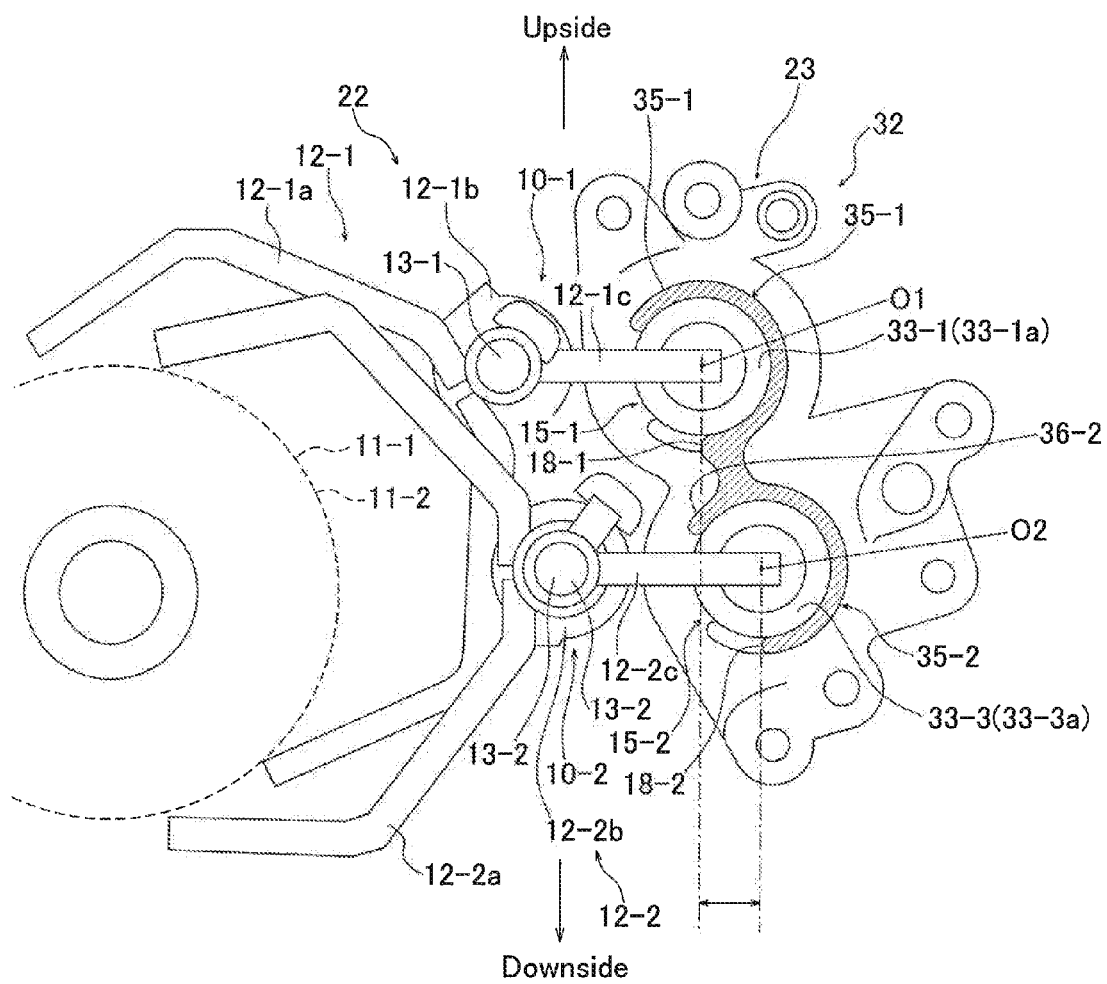
FIG. 2 is a schematic sectional side view of the shift actuator in accordance with the first embodiment viewed from the axial direction.
Figure 3:
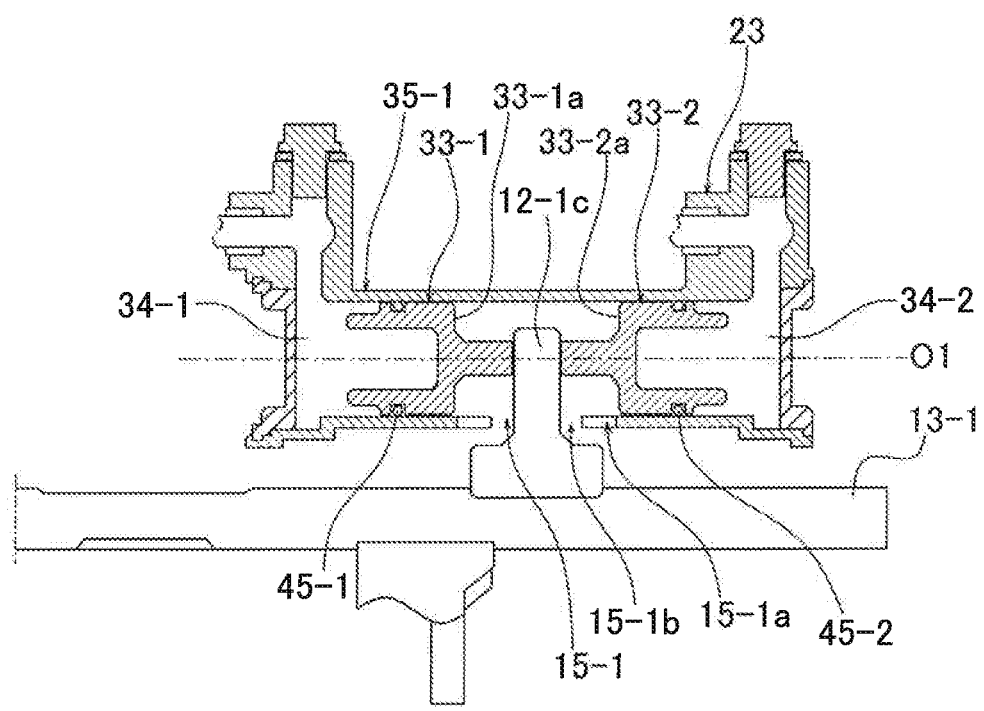
FIG. 3 is a schematic sectional side view of the shift actuator in accordance with the first embodiment viewed from the lateral to the axial direction.

The second synchronous engaging device 22 and the second shift actuator 32 are described hereinafter. FIG. 2 and FIG. 3 show the second synchronous engaging device 22 and the second shift actuator 32. FIG. 2 is a schematic sectional side view of the second synchronous engaging device 22 and the second shift actuator 32 viewed from the axial direction, and FIG. 3 is a schematic sectional side view of a part of the second shift actuator 32 viewed from the lateral to the axial direction. In FIG. 3, further, only the first cylinder 35-1, which is one of the first and the second cylinder 35-1 and 35-2 described hereinafter, with which the second shift actuator 32 is provided and the components relevant to the same are shown. The second synchronous engaging device 22 includes a first mechanism 10-1 for selectively synchronizing and engaging a pair of the drive gears 7b adjacent to each other on the second input shaft 6b, and a second mechanism 10-2 for selectively synchronizing and engaging another pair of the drive gears 7b adjacent to each other on the second input shaft 6b. The second shift actuator 32 includes the first cylinder 35-1 having built-in components for driving the first mechanism 10-1, and the second cylinder 35-2 having built-in components for driving the second mechanism 10-2.

The first mechanism 10-1 is provided with a first synchro sleeve 11-1 having an approximately cylindrical shape with movably installed in the axial direction of the second input shaft 6b and a first shift fork 12-1 attached to the first synchro sleeve 11-1. In addition, the first shift fork 12-1 includes a first fork portion 12-1a having a forked shape with disposed on an outer circumferential side surface of the first synchro sleeve 11-1, a first base portion 12-1b into which a first fork shaft 13-1 is inserted on a root part of the first fork portion 12-1a, and a first arm portion 12-1c having a cylindrical shape with protruding from the first base portion 12-1b toward an opposite direction to the first fork portion 12-1a. The first fork shaft 13-1 penetrates so that the axial direction thereof is orthogonal to the surface of the first fork portion 12-1a, and supports the first shift fork 12-1 so as to be capable of moving back and forth along the axial direction. A tip of the first arm portion 12-1c is inserted to an opening portion 15-1 of the first cylinder 35-1.

The second mechanism 10-2 is provided with a second synchro sleeve 11-2 having an approximately cylindrical shape movably installed in the axial direction of the second input shaft 6b, and a second shift fork 12-2 installed to the second synchro sleeve 11-2. In addition, the second shift fork 12-2 includes a second fork portion 12-2a having a forked shape with disposed on an outer circumferential side surface of the second synchro sleeve 11-2, a second base portion 12-2b into which a second fork shaft 13-2 is inserted on a root part of the second fork portion 12-2a, and a second arm portion 12-2c having a cylindrical shape with protruding from the second base portion 12-2b toward an opposite direction to the second fork portion 12-2a. The second fork shaft 13-2 penetrates so that the axial direction thereof is orthogonal to the surface of the second fork portion 12-2a, and supports the second shift fork 12-2 so as to be capable of moving back and forth along the axial direction. A tip of the second arm portion 12-2c is inserted to a second opening portion 15-2 of the second cylinder 35-2.

Hereupon, in a plurality of the odd-numbered gear shift stages achieved by the drive gears 7a on the second input shaft 6b, the gear shift stages achieved by the second mechanism 10-2 are higher than the gear shift stages achieved by the first mechanism 10-1 (gear shift stages on a low ratio OD). For example, the gear shift stages achieved by the first mechanism 10-1 can be set to the first speed stage and the third speed stage, and the gear shift stages achieved by the second mechanism 10-2 can be set to the fifth speed stage and the seventh speed stage.

Figure 4:
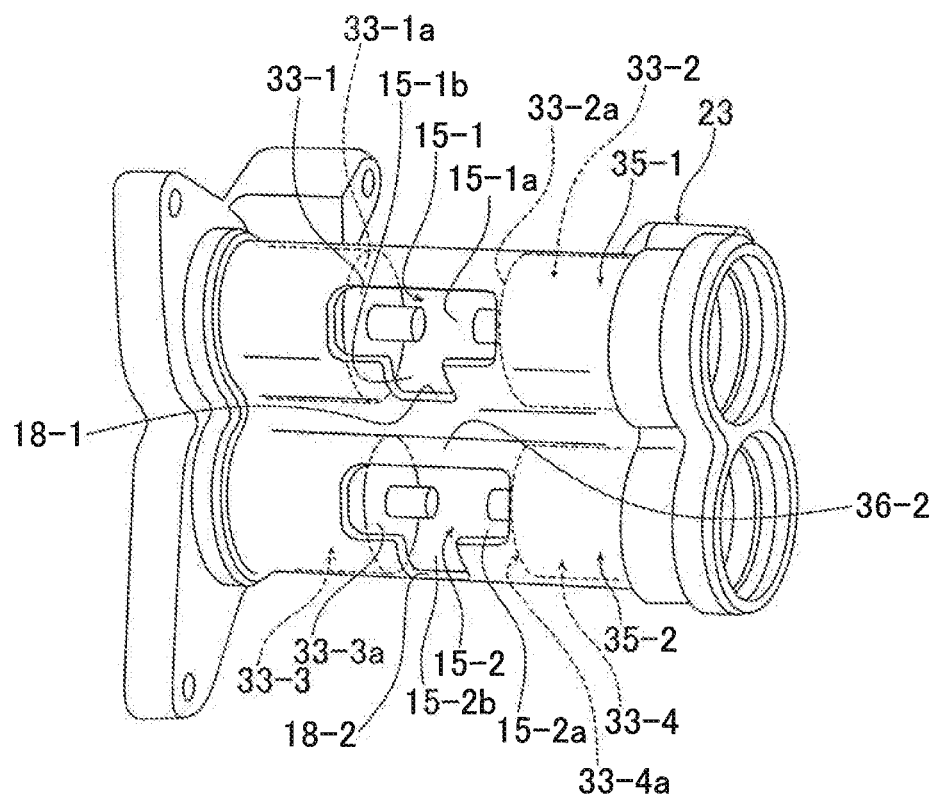
FIG. 4 is a perspective view showing a cylinder body of the shift actuator in accordance with the first embodiment.

In addition, the second shift actuator 32 includes a cylinder body 23 at which the first and the second cylinder 35-1 and 35-2 are formed. FIG. 4 is a perspective view for showing a cylinder body 23. The first and the second cylinder 35-1 and 35-2 both include a hollow approximately cylindrical portion. And the first and the second cylinder 35-1 and 35-2 are vertically arranged at predetermined intervals by paralleling the cylindrical axial directions (hereinafter referred to as "axial direction") of each other, and each of the cylinders 35-1 and 35-2 is arranged so that the axial directions thereof are parallel to the axial direction (shift direction) of the first fork shaft 13-1. In addition, the first opening portion 15-1 to which the first arm portion 12-1c of the first shift fork 12-1 is inserted is formed on the lateral surface to the axial direction of the first cylinder 35-1, and the second opening portion 15-2 to which the second arm portion 12-2c of the second shift fork 12-2 is inserted is formed on the lateral surface to the axial direction of the second cylinder 35-2.

Also, the arm portion 12-1c of the first shift fork 12-1 inserted to the first opening portion 15-1 of the first cylinder 35-1 is disposed between a first piston 33-1 and a second piston 33-2. Whereby, the first shift fork 12-1 is driven to the shift direction by the first piston 33-1 or the second piston 33-2 which slides in the first cylinder 35-1 by oil pressure of a first fluid pressure chamber 34-1 or a second fluid pressure chamber 34-2. In addition, O-rings (seal members) 45-1, 45-2 are installed between each of the outer circumferential surfaces of the first and the second piston 33-1, 33-2 and the inner circumferential surface of the cylinder.

Similarly, the arm portion 12-2c of the second shift fork 12-2 inserted to the second opening portion 15-2 of the second cylinder 35-2 is disposed between a third piston 33-3 and a fourth piston 33-4 (c.f. FIG. 4). Whereby, the second shift fork 12-2 is driven to the shift direction by the third piston 33-3 or the fourth piston 33-4 which slides in the second cylinder 35-2.

Next, the first and the second opening portion 15-1 and 15-2 are described. In addition, though the first opening portion 15-1 is described hereinafter since the first opening portion 15-1 and the second opening portion 15-2 have a mutually the same shape, the same is applied to the second opening portion 15-2. As shown in FIG. 4, the first opening portion 15-1 is formed to be an approximate T-shape including a lateral groove 15-1a having a length dimension of the axial direction larger than a movable range of the first arm portion 12-1c and a vertical groove 15-1b extending from a lower end of the lateral groove 15-1a toward the lower side of the vertical direction and having a length dimension of the axial direction shorter than the lateral groove 15-1a. Also, as shown in FIG. 2, an upper end of the lateral groove 15-1a in a circumferential direction of the first cylinder 35-1 reaches a higher position than the first arm portion 12-1c of the first shift fork 12-1, and a lower end 18-1 of the vertical groove 15-1b in a circumferential direction of the first cylinder 35-1 reaches a just under position (just below position) in the vertical direction of the first cylinder 35-1.

Thus, by means of the shift actuator (the second shift actuator) 32 of the present embodiment, the opening portion 15-1 formed on the first cylinder 35-1, to which the shift fork (shift operating member) 12-1 is inserted is provided opening only to a part of the circumferential direction of the first cylinder 35-1, whereby holdability of the first and the second piston 33-1 and 33-2 by the first cylinder 35-1 and rigidity of the first cylinder 35-1 can be secured, thereby the first and the second piston 33-1 and 33-2 are prevented from disengaging and tumbling. Meanwhile, the lower end 18-1 of the opening portion 15-1 in the circumferential direction of the first cylinder 35-1 reaches a just under position in the vertical direction of the first cylinder 35-1, whereby hydraulic oil in the first cylinder 35-1 can be discharged to the outside from the first opening portion 15-1 according to a stroke of the first and the second piston 33-1 and 33-2. This enables to discharge micro foreign matters (contamination) included in hydraulic oil to the outside of the first cylinder 35-1, whereby wears and damages on the inner circumferential surface of the first cylinder 35-1 can be prevented.

In addition, the first opening portion 15-1 is formed to be an approximate T-shape including the vertical groove 15-1b and the lateral groove 15-1a, whereby dischargeability of hydraulic oil and micro foreign matters (contamination) from the first opening portion 15-1 can be improved with securing holdability (against disengagement and tumble) of the first and the second piston 33-1 and 33-2 by the first cylinder 35-1.

Furthermore, in the present embodiment, the two cylinders 35-1 and 35-2 are provided, and the two cylinders 35-1 and 35-2 are, as shown in FIG. 2, vertically arranged adjacent to each other, and the centers O1 and O2 of each cylinder 35-1 and 35-2 are disposed on mutually shifted positions in the lateral direction to the vertical direction. Also, the opening portions 15-1 and 15-2 are respectively formed on each cylinder 35-1 and 35-2, and a side wall (an outer circumferential wall) 36-2 other than the opening portion 15-2 of the cylinder 35-2 on the lower side are disposed on a just under position in the vertical direction to the lower end 18-1 of the opening portion 15-1 (vertical groove 15-1b) of the cylinder 35-1 on the upper side.

This configuration enables to prevent hydraulic oil including micro foreign matters (contamination) discharged from the opening portion 15-1 (the vertical groove 15-1b) of the cylinder 35-1 on the upper side from intruding to the opening portion 15-2 of the cylinder 35-2 on the lower side.

Figure 5A:
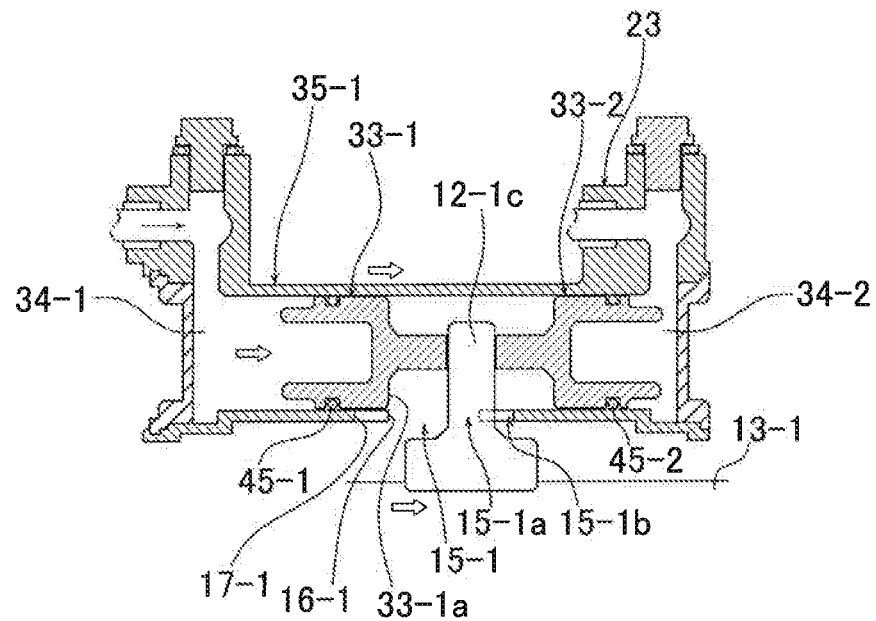
FIG. 5A and FIG. 5B illustrate the setting of a dimensional shape of an opening portion provided on the cylinder, and is a schematic sectional side view of the shift actuator.
Figure 5B:
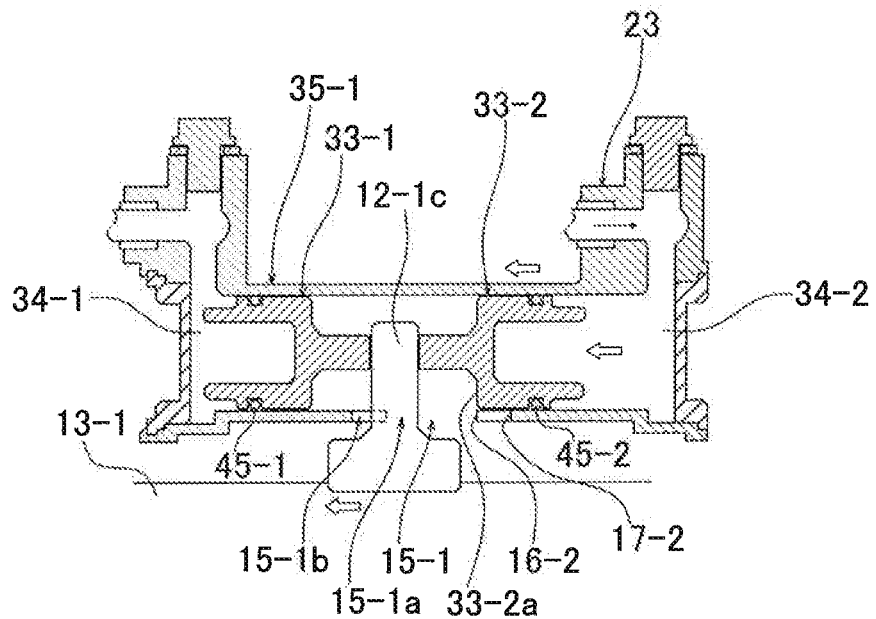

FIG. 5A and FIG. 5B illustrate the setting of a dimensional shape and operation of the first opening portion 15-1 provided on the first cylinder 35-1. In the present embodiment, as shown in FIG. 5A, a position of an end surface 33-1a near the arm portion 12-1c of the first piston 33-1 is set to be the same position as one end side 16-1 of the vertical groove 15-1b at a maximum stroke position where the first piston 33-1 has maximally moved toward the arm portion 12-1c. In addition, as shown in FIG. 5B, a position of an end surface 33-2a near the arm portion 12-1c of the second piston 33-2 is set to be the same position as the other end side 16-2 of the vertical groove 15-1b at a maximum stroke position where the second piston 33-2 has maximally moved toward the arm portion 12-1c.

In addition, as shown in FIG. 5A and FIG. 5B, the O-rings (seal members) 45-1, 45-2 installed between each of the outer circumferential surfaces of the first and the second piston 33-1, 33-2 and the inner circumferential surface of the first cylinder 35-1 are disposed on a position unexposed to the lateral groove 15-1a at a maximum stroke position of the first and the second piston 33-1, 33-2 (a position of the inner side (the front side) than the end sides 17-1 and 17-2 of the lateral portion 15-1a).

Thus, O-rings 45-1 and 45-2 are disposed on a position unexposed to the lateral groove 15-1a at a maximum stroke position of the first and the second piston 33-1 and 33-2, whereby O-rings 45-1 and 45-2 can be prevented from contacting the end sides 17-1 and 17-2 of the lateral groove 15-1a according to a stroke of the first and the second piston 33-1 and 33-2. Therefore, deterioration and damage of the O-rings 45-1 and 45-2 according to a stroke of the first and the second piston 33-1 and 33-2 can be prevented.

The Second Embodiment

Next, the second embodiment of the present invention is described. By the way, in the descriptions and corresponding drawings of the second embodiment, the same references are given to the same or corresponding components to the first embodiment, and the detailed descriptions of the parts are omitted hereinafter. In addition, the matters undescribed herein after and the same unillustrated are the same to the first embodiment.

Figure 6:
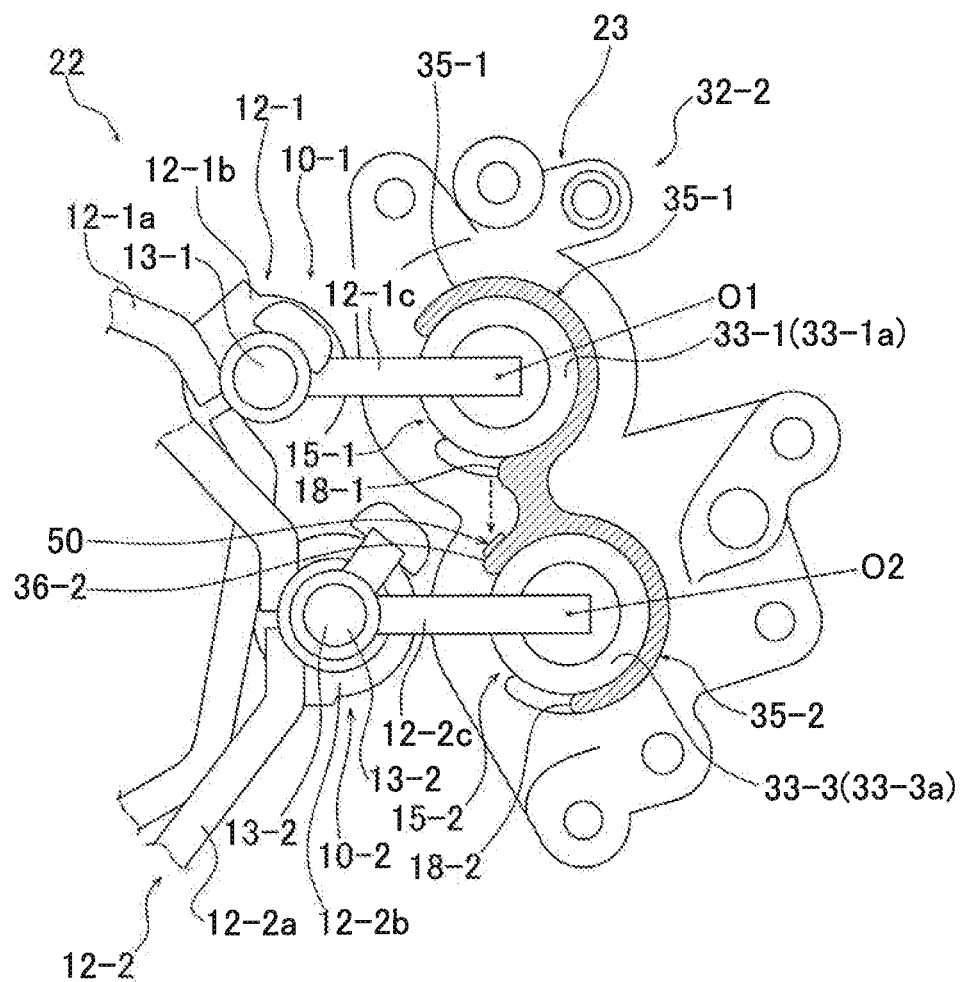
FIG. 6 is a schematic sectional side view of the shift actuator in accordance with the second embodiment viewed from the axial direction.
Figure 7:
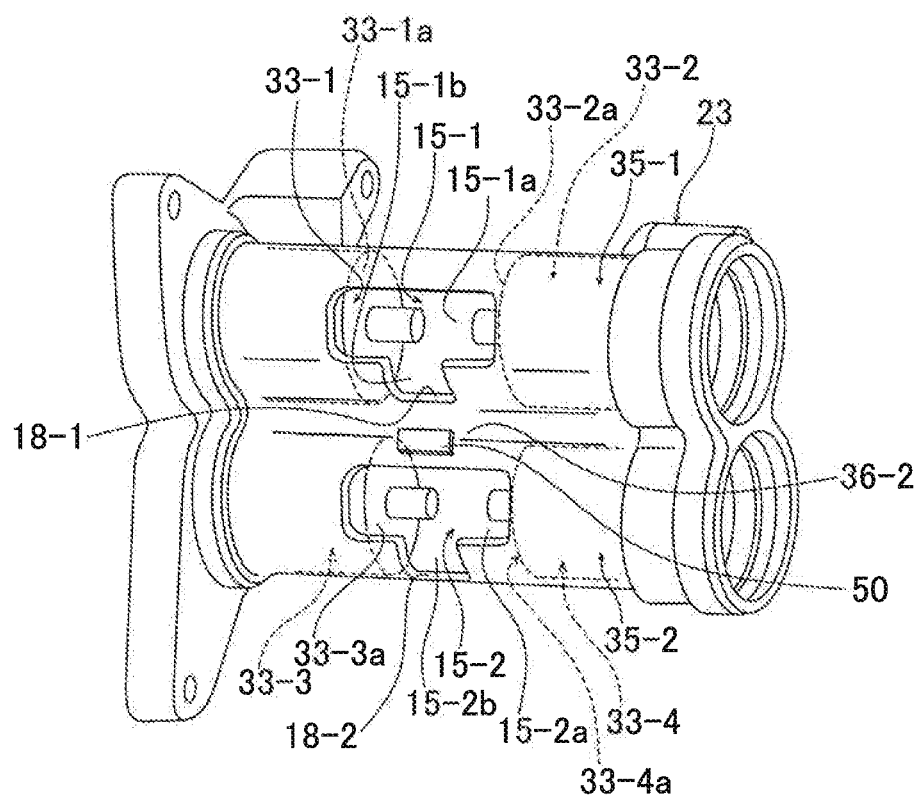
FIG. 7 is a perspective view showing the cylinder body of the shift actuator in accordance with the second embodiment.

FIG. 6 is a schematic sectional side view of the shift actuator (the second shift actuator) 32-2 in accordance with the second embodiment of the present invention viewed from the axial direction. Furthermore, FIG. 7 is a perspective view showing the cylinder body 23 of the shift actuator 32-2 in accordance with the second embodiment. The shift actuator 32-2 of the present embodiment includes a magnetic substance 50 disposed on a just under position in the vertical direction of the vertical groove 15-1b of the cylinder 35-1 on the upper side on the side wall 36-2 of the cylinder 35-2 on the lower. The magnetic substance 50 may be a thin-plate shaped permanent magnet, and is joined and installed to the metal-made cylinder body 23 by magnetic force.

By means of the shift actuator 32-2, by including the above-mentioned magnetic substance 50, micro foreign matters (contamination) such as metal powder included in hydraulic oil discharged from the vertical groove 15-1b of the cylinder 35-1 on the upper side can be absorbed and caught by the magnetic substance 50. Thereby, micro foreign matters can be more effectively prevented from intruding to the cylinder 35-2 on the lower side.

Though the embodiments of the present invention are as described above, the present invention isn't limited to the above-mentioned embodiments, and various deformations can be achieved within a range of the technical ideas described in Claims, Specification, and Drawings. For example, though the shift actuator 32 of the above-mentioned embodiments operates by oil pressure supplied to the first and the second fluid pressure chamber 34-1 and 34-2, the shift actuator according to the present invention may be configured so as to operate by pressure of another medium (fluid or gas) other than oil. Furthermore, the opening portion of the cylinder with which the shift actuator according to the present invention is provided is not limited to the approximately T-shaped opening portions 15-1 and 15-2 shown in the above-mentioned embodiments, other shapes can be applied. For example, a cross-shape and the like are applicable. Also, in the above-mentioned embodiments, though the case where the lower end of the opening portion (vertical groove) is on a just under position in the vertical direction of the cylinder is shown, without being limited to this, the lower end of the opening portion (vertical groove) may be further extended beyond the just under position in the vertical direction of the cylinder. In addition, a specific size and an arrangement of the opening portion are not limited to the shown in the above-mentioned embodiments. Furthermore, specific shapes of the cylinder body (cylinder) and the piston are not limited to the shown in the above-mentioned embodiments.

What is claimed is:

1. A shift actuator comprising:
   a cylinder;
   a first piston and a second piston coaxially arranged in the cylinder;
   a first and a second fluid pressure chamber defined in the cylinder for providing fluid pressure to each of the first and the second piston;
   a shaft disposed so that the axial direction thereof is parallel to the axial direction of the cylinder; and
   a shift operating member supported by the shaft with inserted and disposed between the first piston and the second piston to move back and forth along the axial direction of the shaft, and wherein:
   an opening portion to which the shift operating member is inserted is formed on a lateral side surface to the axial direction of the cylinder,
   the opening portion is provided opening only to a part of the circumferential direction of the cylinder, and
   a lower end of the opening portion in the circumferential direction of the cylinder reaches a position that is below the opening portion of the cylinder in a vertical direction of the cylinder,
   wherein the opening portion is formed to be a shape comprising:
   a lateral groove having a length dimension of the axial direction larger than a movable range of the shift operating member, and
   a vertical groove further extended to the lower side beyond a lower end of the lateral groove and having a length dimension of the axial direction shorter than the lateral groove, wherein
   the opening portion is formed to be an approximate T-shape comprising the lateral groove and the vertical groove, and
   a lower end of the vertical groove in the circumferential direction of the cylinder reaches a position that is below the opening portion of the cylinder in the vertical direction.

2. The shift actuator according to claim 1,
   wherein a position of an end surface facing the shift operating member of the first piston is same as a position of one end side of the vertical groove at a maximum stroke position where the first piston has maximally moved toward the shift operating member; and,
   wherein a position of an end surface facing the shift operating member of the second piston becomes same as a position of the other end side of the vertical groove at a maximum stroke position where the second piston has maximally moved toward the shift operating member.

3. The shift actuator according to claim 2,
   further comprising at least another cylinder which has the same configuration as the cylinder,
   the two cylinders are vertically arranged adjacent to each other, and centers of each cylinder are disposed on mutually shifted positions in the lateral direction to the vertical direction, therewith
   the opening portions are formed on each cylinder respectively, and
   a side wall other than the opening portions of the cylinder on the lower side are disposed on a position that is below the opening portion of the cylinder in the vertical direction to the lower end of the vertical groove of the cylinder on the upper side.

4. The shift actuator according to claim 2,
   wherein a magnetic substance is installed on a position including a position that is below the opening portion of the cylinder in the vertical direction of the vertical groove of the cylinder on the upper side on the side wall of the cylinder on the lower side.

5. The shift actuator according to claim 2,
   further comprising a seal member disposed between each outer circumferential surface of the first and the second piston and an inner circumferential surface of the cylinder, and
   wherein the seal member is disposed on a position unexposed to the lateral groove at a maximum stroke position of the first and the second piston.

6. The shift actuator according to claim 1,
   further comprising at least another cylinder which has the same configuration as the cylinder,
   the two cylinders are vertically arranged adjacent to each other, and centers of each cylinder are disposed on mutually shifted positions in the lateral direction to the vertical direction, therewith the opening portions are formed on each cylinder respectively, and
   a side wall other than the opening portions of the cylinder on the lower side are disposed on a position that is below the opening portion of the cylinder in the vertical direction to the lower end of the vertical groove of the cylinder on the upper side.

7. The shift actuator according to claim 6,
   wherein a magnetic substance is installed on a position including a position that is below the opening portion of the cylinder in the vertical direction of the vertical groove of the cylinder on the upper side on the side wall of the cylinder on the lower side.

8. The shift actuator according to claim 6,
   further comprising a seal member disposed between each outer circumferential surface of the first and the second piston and an inner circumferential surface of the cylinder, and
   wherein the seal member is disposed on a position unexposed to the lateral groove at a maximum stroke position of the first and the second piston.

9. The shift actuator according to claim 1,
   wherein a magnetic substance is installed on a position including a position that is below the opening portion of the cylinder in the vertical direction of the vertical groove of the cylinder on the upper side on the side wall of the cylinder on the lower side.

10. The shift actuator according to claim 9,
    further comprising a seal member disposed between each outer circumferential surface of the first and the second piston and an inner circumferential surface of the cylinder, and
    wherein the seal member is disposed on a position unexposed to the lateral groove at a maximum stroke position of the first and the second piston.

11. The shift actuator according to claim 1,
further comprising a seal member disposed between each outer circumferential surface of the first and the second piston and an inner circumferential surface of the cylinder, and
wherein the seal member is disposed on a position unexposed to the lateral groove at a maximum stroke position of the first and the second piston.

* * * * *